United States Patent [19]

Wells et al.

[11] Patent Number: 4,601,265
[45] Date of Patent: Jul. 22, 1986

[54] INTERNAL COMBUSTION ENGINE WITH IMPROVED COOLANT ARRANGEMENT

[75] Inventors: Larry Wells; Nigel Gale, both of Columbus; J. Dan Baugh, Greensburg, all of Ind.

[73] Assignee: Cummins Engine Company, Inc., Columbus, Ind.

[21] Appl. No.: 749,743

[22] Filed: Jun. 28, 1985

[51] Int. Cl.$^4$ .............................................. F01P 3/02
[52] U.S. Cl. ........................... 123/41.28; 123/41.74; 123/41.82 R; 123/41.79
[58] Field of Search ............... 123/41.28, 41.72, 41.74, 123/41.79, 41.82 R

[56] References Cited

U.S. PATENT DOCUMENTS

| | | | |
|---|---|---|---|
| 1,680,567 | 8/1928 | Pitzman | 123/41.28 |
| 2,188,876 | 1/1940 | Fahlman | 123/41.28 |
| 2,368,080 | 1/1945 | Ginn et al. | 123/41.28 |
| 2,713,332 | 7/1955 | Beardsley | 123/41.28 |
| 2,953,126 | 9/1960 | Kolbe | 123/41.28 |
| 3,465,734 | 9/1969 | Moore et al. | 123/41.28 |
| 4,284,037 | 8/1981 | Kasting et al. | 123/41.72 |
| 4,305,348 | 12/1981 | Martin | 123/41.82 R |

FOREIGN PATENT DOCUMENTS

| | | | |
|---|---|---|---|
| 982469 | 6/1951 | France | 123/41.79 |
| 1265980 | 3/1972 | United Kingdom | 123/41.79 |

Primary Examiner—William A. Cuchinski, Jr.
Attorney, Agent, or Firm—Sixbey, Friedman & Leedom

[57] ABSTRACT

An internal combustion engine, of the type having a block with a line of cylinders and a cylinder head attached to the block and coolant distribution and discharge manifolds provided adjacent each other on one side of the block is provided with an improved coolant arrangement. Coolant from a pump enters the distribution manifold at a point intermediate the ends of the line of cylinders and from there flows freely up into the cylinder head through cast openings corresponding in number to the number of cylinders. The majority of coolant flows across the cylinder head and down to coolant chambers surrounding the engine cylinders via a pair of orificed holes for each cylinder. The orificed holes control the flow of coolant around the cylinders and are provided in a gasket between the cylinder block and cylinder head. After the coolant flows around the cylinder liners, it is discharged from the coolant chambers in the cylinder block to the discharge manifold via a cast opening for each cylinder. In order to prevent creation of an air pocket at the top of the discharge side of the coolant chambers, a portion of the coolant entering into the head is routed directly, via a small opening, to the coolant chambers surrounding each cylinder cavity. To ensure that this coolant flow is distributed around the top of each cylinder liner, a deflector ledge is situated directly below this coolant opening.

17 Claims, 8 Drawing Figures

INTERNAL COMBUSTION ENGINE WITH IMPROVED COOLANT ARRANGEMENT

TECHNICAL FIELD

The present invention relates to internal combustion engines, such as diesel engines, of the type that include at least one line of cylinders formed in a block and a head secured to the top of the block, wherein a liquid coolant is circulated by a pump so as to flow in a circuit through the cylinder head and block. In particular, the present invention relates to internal combustion engines of the noted type wherein an attempt has been made to balance the flow of engine coolant so as to eliminate hot spots, while attaining a compact engine configuration.

BACKGROUND ART

Kolbe U.S. Pat. No. 2,953,126 discloses an engine coolant distribution arrangement in an internal combustion engine having a flow path extending, from a water pump at the front of the engine, longitudinally through the cylinder block from one end to the other and from which portions of the coolant flow are bled off to create parallel flow paths through the cylinder head. In order to obtain more uniform engine cooling, the passages leading to the cylinder head coolant passages from the engine block coolant block passages are graduated so that the smallest passages are adjacent the block coolant entry passage and the largest passage is at the opposite end of the cylinder block coolant passage.

In a comparable manner, Beardsley U.S. Pat. No. 2,713,332, discloses an internal combustion engine cooling system wherein the coolant inlet manifold extends longitudinally, from a pump in front of the engine, along a cylinder bank and coolant is delivered from it into a distributing header where the flow is divided; a portion of the coolant travelling through the cylinder head to an outlet in a manner passing over the valve guides, while another portion of the coolant passes through openings into a cylinder block jacket where it circulates around the cylinders. In order to balance the coolant flow, the effective cross sectional area of the inlet manifold progressively decreases from the end thereof connected to the pump to its opposite end remote from the pump and the openings through which coolant travels from the inlet manifold into the cylinder head are constructed such that the openings nearest the pump have a slightly smaller cross-sectional area than those disposed at the opposite end of the inlet manifold.

While coolant flow arrangements of the above-noted type do obtain some improvement in terms of balancing the cooling effect, a mere progressive change in the size of the flow passages between the cylinder head and the cylinder block does not take into account various other factors which affect the ability for the coolant to achieve an equalized heat absorbing effect. Fahlman U.S. Pat. No. 2,188,876, discloses a cylinder head for an engine wherein coolant enters the cylinder block at the front end of the engine and exits the engine at a longitudinally central point at one side of the cylinder head, and that is designed for obtaining a substantially uniform temperature around the combustion chambers and an equalized cooling effect. To do so, Fahlman not only takes into account the distance of the passages between the head and block from the coolant inlet, but also takes into account the fact that parts of the engine will have different cooling requirements than other parts. Accordingly, to obtain a uniform temperature around all of the combustion chambers, the size of the inlets from the coolant jacket of the engine block into the cylinder head and the cross-sectional area of the flow passages along the cylinder head are varied to obtain a rate and quantity of flow across the cylinder head which will produce a uniform cooling effect (i.e., will distribute the cooling capacity of the coolant so that the hottest parts receive the greatest cooling effect). In particular, the head is treated in stages corresponding to respective sides of each of the combustion chambers (5 stages in a 4 cylinder engine) with the relative flow being proportioned from section to section and within each section.

For the stage closest the engine block coolant jacket inlet, the area of the inlet passages account for 24% of the total area, while those of the stage furthest therefrom account for 37% of the total area. Furthermore, the passages in the central stage (stage nearest the outlet from the cylinder head) account for 17% of the total area while the passages of the adjacent stage on the side toward the jacket inlet account for 14% of the total inlet area and the stage between the central stage and the stage furthest from the jacket inlet has inlet passages accounting for 59% of the total inlet area. Additionally, the inlet passages within each stage are proportioned in accordance with the noted criterion and thus do not have areas whose size correlate directly with their positional pattern. For example, the central stage has three inlet passages of progressively increasing size in a first transverse direction while the stages adjacent thereto each have two different size pairs of equal area inlet passages with the larger one pair of passages of one of these adjacent stages being located on the opposite side of the engine relative to the larger pair of inlet passages of the other adjacent stage.

However, in addition to the complexities of implementing Fahlman's method of cooling an internal combustion engine, the disclosure of this patent fails to take into consideration the fact that a fuel supply system, such as a fuel injector, and a valve arrangement normally are situated in the cylinder head and place practical limitations on the manner in which coolant may be circulated (the engine disclosed in U.S. Pat. No. 2,188,876 having no fuel supply means or valves associated with its engine cylinders).

U.S. Pat. No. 4,284,037, owned by the assignee of the present application, discloses an internal combustion engine coolant system having coolant feed and collection manifolds provided on one side of the cylinder block adjacent each other, and a coolant pump mounted adjacent to and connected with the manifolds on the block. For each cylinders, separate flow passages are formed on the block which conduct the coolant from the feed manifold around the cylinder, up and into the head, across the head and adjacent the injector and the valves, and then down from the head into the collection manifold on the block.

The respective flow paths of coolant through the head are substantially separated and the sizes of the flow passages associated with the various paths are designed to obtain a uniform heat transfer pattern among the various cylinders by controlling the quantity of flow in each path and by providing a valve orientation wherein, for each cylinder, two valves are on the longitudinal axis of the head and another two are on a line that is perpendicular to this axis. Along with partition walls which prevent the coolant from flowing straight across the head, this arrangement forces the coolant to flow at 45 degree angles between pairs of valves to and from the injector, the coolant flowing above and below the exhaust passages after having passed the injector. Additionally, the exhaust ports are relatively close to the exhaust manifold side of the head and the exhaust passages are relatively short, whereby the heated exhaust is removed from the head as quickly as possible.

However, problems exist in adapting such an engine configuration to engines wherein all of the cylinder valves are arranged in a longitudinally extending line, a single pair of closely spaced valves being provided at each cylinder and the injector being situated at a lateral side of the valves opposite the coolant feed and collection manifolds. For example, the cross paths can no longer be maintained and the laterally positioned injector interferes with cooling of the valves by the flow coming across the head after having come up from the cylinder block, since the injector partially shields same. On the other hand, obtaining of the most compact configuration for the engine (for purposes of minimizing weight and space requirements), as well as other considerations, make it impossible to place the various parts so as to facilitate coolant distribution.

DISCLOSURE OF THE INVENTION

It is the general object of the present invention to provide an internal combustion engine which will enable the flow of engine coolant to be balanced so as to eliminate hot spots, while enabling a compact engine configuration to be obtained.

In keeping with this general object, it is a specific object of the present invention to provide an engine wherein coolant travels through the cylinder head from a distribution manifold, on a path across and between the valves before travelling down into the cylinder block, around the cylinders and into a discharge manifold on the block.

It is yet another object in accordance with the present invention to enable a uniform distribution of the coolant through the head by controlling the sizing of the outlets from the head into the block.

It is yet another object in accordance with the present invention to ensure that coolant circulated through the block fully encompasses the entirety of the cylinder spaces without creation of an air pocket.

An internal combustion engine in accordance with a preferred embodiment of the present invention comprises a block having a line of cylinders and a head attached to the block and supporting intake and exhaust valves and an injector for each cylinder. Coolant distribution and discharge collection manifolds are provided adjacent each other on one side of the block. A coolant pump is connected with the distribution manifold at a point intermediate the ends of the line of cylinders. From the distribution manifold, coolant flows freely up into the cylinder head through cast openings corresponding in number to the number of cylinders. The majority of the coolant flows across the valve bridges, around the injector nozzles and down to the coolant chambers surrounding the liners via a pair of orificed holes for each cylinder. The orifices control the flow of coolant around the liners and are provided in the gasket between the cylinder block and cylinder head. After the coolant flows around the cylinder linings, it is discharged from the coolant chambers in the cylinder block to the discharge manifold via cast opening for each cylinder. In order to prevent creation of an air pocket at the top of the discharge side of the coolant chambers, a portion of the coolant entering into the head is routed directly, via a small opening, to a coolant chamber surrounding each cylinder cavity for a difusion around the top of each cylinder liner. To ensure that this coolant flow is distributed around the top of each cylinder liner and does not travel immediately to the outlet to the coolant discharge manifold, a deflector ledge is situated directly below the coolant entry point from the head into cylinder block. The coolant is discharged from the collection manifold at the front end of the engine where the thermostat arrangement is located.

These and further objects, features and advantages of the present invention will become more obvious from the following description when taken in connection with the accompanying drawings which show, for purposes of illustration only, several embodiments in accordance with the present invention.

BEST MODE FOR CARRYING OUT THE INVENTION

At the outset, it is noted that the present invention will be described with reference to an inline six cylinder diesel engine, but it will be recognized that principles of the present invention may also be applied to other engine types, as well.

Figure 1:
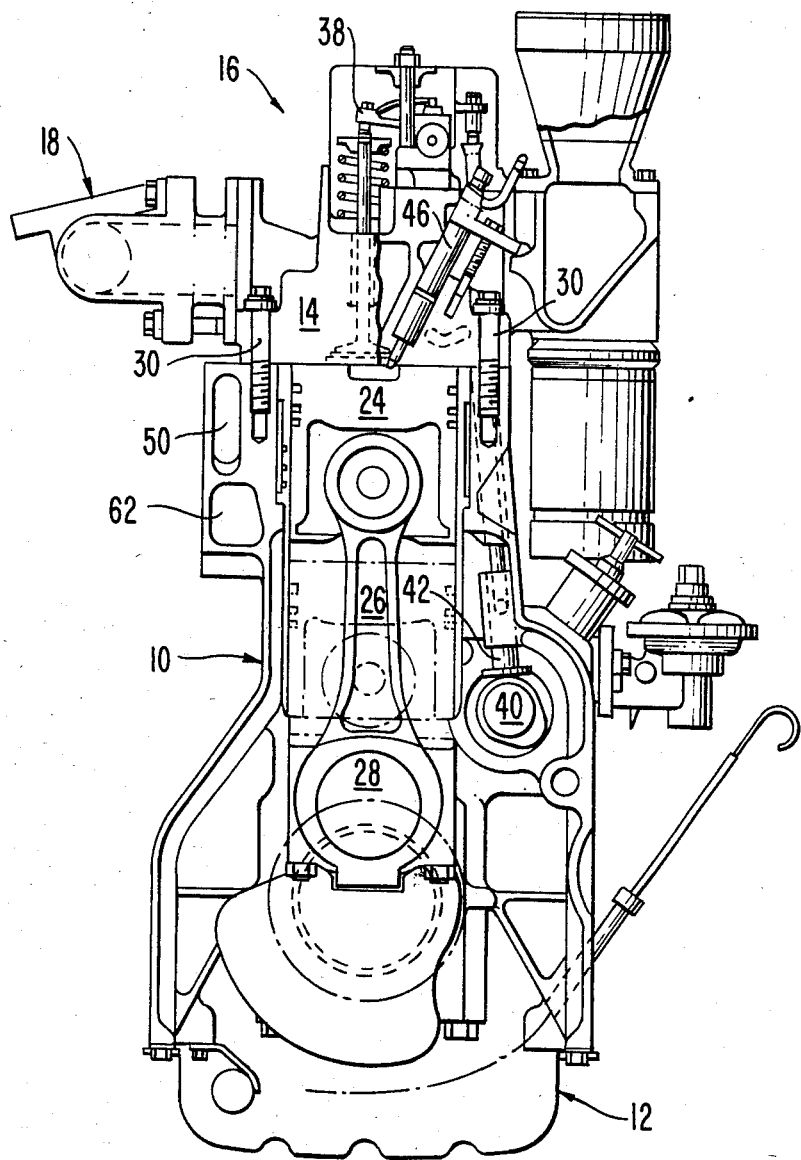
FIG. 1 is a view, partially in section, of the front of an internal combustion engine in accordance with a preferred embodiment of the present invention.
Figure 2:
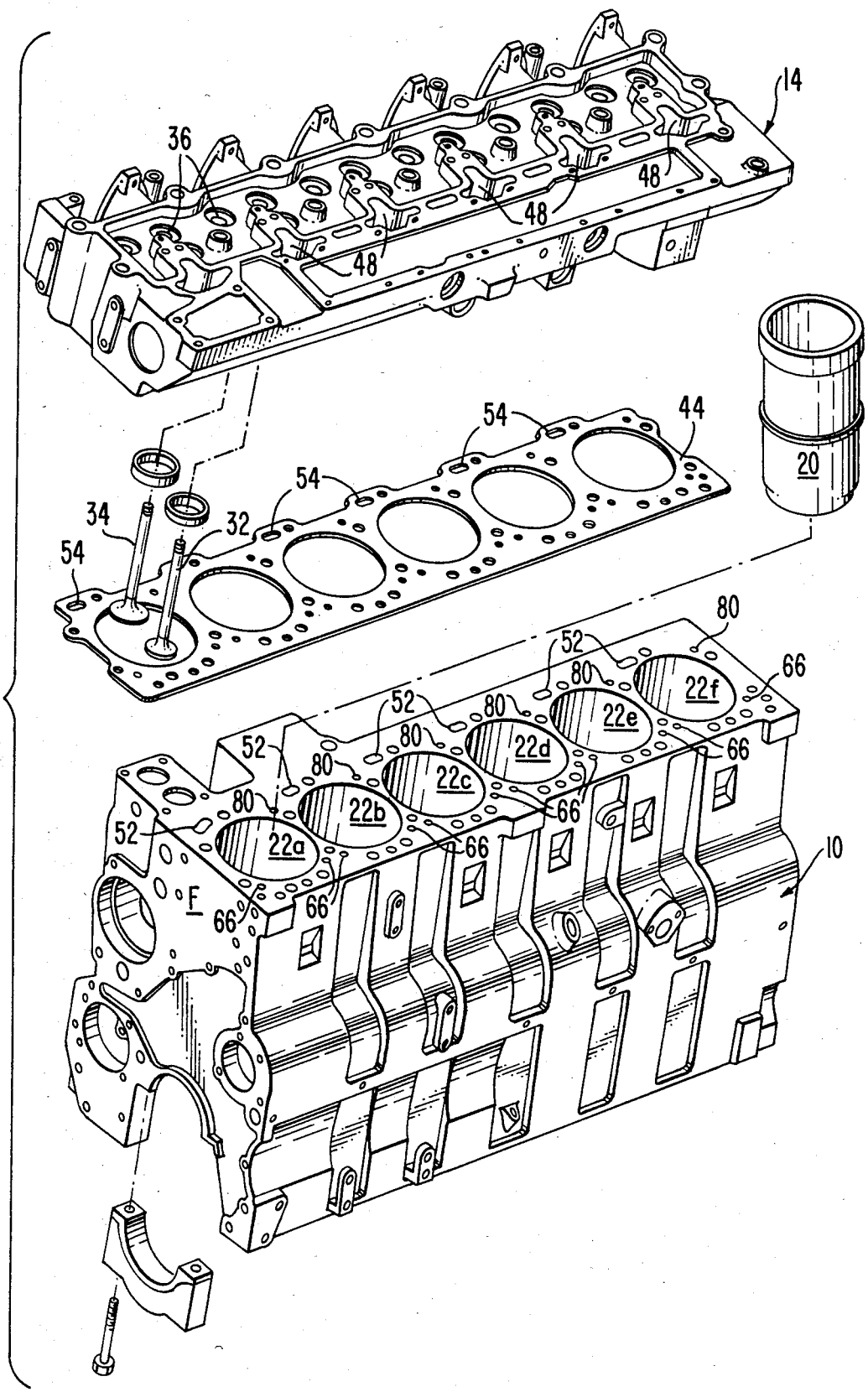
FIG. 2 is an exploded perspective view of a portion of the engine illustrated in FIG. 1.

With reference to FIGS. 1 and 2, it can be seen that the engine includes a block 10, a crankcase and pan 12, a cylinder head 14, and a rocker housing and cover 16. An exhaust manifold 18 is attached to the side of the head.

A cylinder liner 20 is mounted within each cylinder space 22 of the block so as to define a cylinder space within which a respective piston 24 is reciprocated by an associated connector arm 26 which is connected at its opposite end to the crankshaft 28. The cylinder head 14 is secured to the top of the block 10 by twenty-six bolts 30. A pair of valves, an exhaust valve 32 and an intake valve 34, are longitudinally positioned in close proximity to one another in the head 14 above each of the cylinder spaces 22a-f. The shafts of the valves extend through apertures 30 in the head up to a location where they can be contacted by rocker arms 38 that are operated by the cam shaft 40 via rocker actuating rods 42 (only one of each of these parts being illustrated in the drawings). A head gasket 44 seals the junction between the top surface of block 10 and the bottom surface of head 14 and is provided with apertures corresponding to the cylinders and various engine-head through passages, as will be described in greater detail later on. Also disposed in the cylinder head 14, are respective fuel injectors 46 which are disposed between each pair of valves 32, 34 at an upwardly inclined angle of approximately 60 degrees toward the cam shaft side of the engine. For this purpose, head 14 is provided with injector nozzle receiving holes 48.

In the context of the above described engine, the improved coolant flow arrangement of the present invention will now be described.

Coolant is supplied into a distribution manifold 50 at a location I (FIG. 6) that is situated, relative to the front of the engine F (FIGS. 2, 5 and 6), between the second and third cylinders (the coolant pump receiver 51, but not the pump being shown). From the point of entry into the distribution manifold 50, coolant flows longitudinally of the engine forwardly along cylinders 22b and 22a and rearwardly along cylinders 22c-22f. From the distribution manifold, coolant passes upwardly from the block 10 into the cylinder head 14 through an alinged series of passages formed by intake apertures formed in the top of the block (52), the head gasket (54) and cylinder head (56). A single set of apertures 52, 54, 56 (FIG. 7) is provided for each cylinder at the downstream side, relative to flow into the manifold 50, with respect to the cylinder space 22a and 22b and on the upstream side relative to cylinders 22c-22f. Furthermore, all of the apertures 52, 54, 56, are of the same size and configuration. In this regard, it is noted that these apertures have an elongated configuration which increases in width in a direction of decreasing width of the portion of the block surrounding the cylinder spaces so as to maximize the amount of flow that can be transmitted therethrough without adversely affecting the strength of the cylinder block and head. For example, apertures 52, 54, 56 may have a small end of a semi-circular shape of a 7.5 mm radius, a large end of a semi-circular shape of an 8 mm radius, and a 10 mm trapezoidal transition section therebetween.

Figure 3:
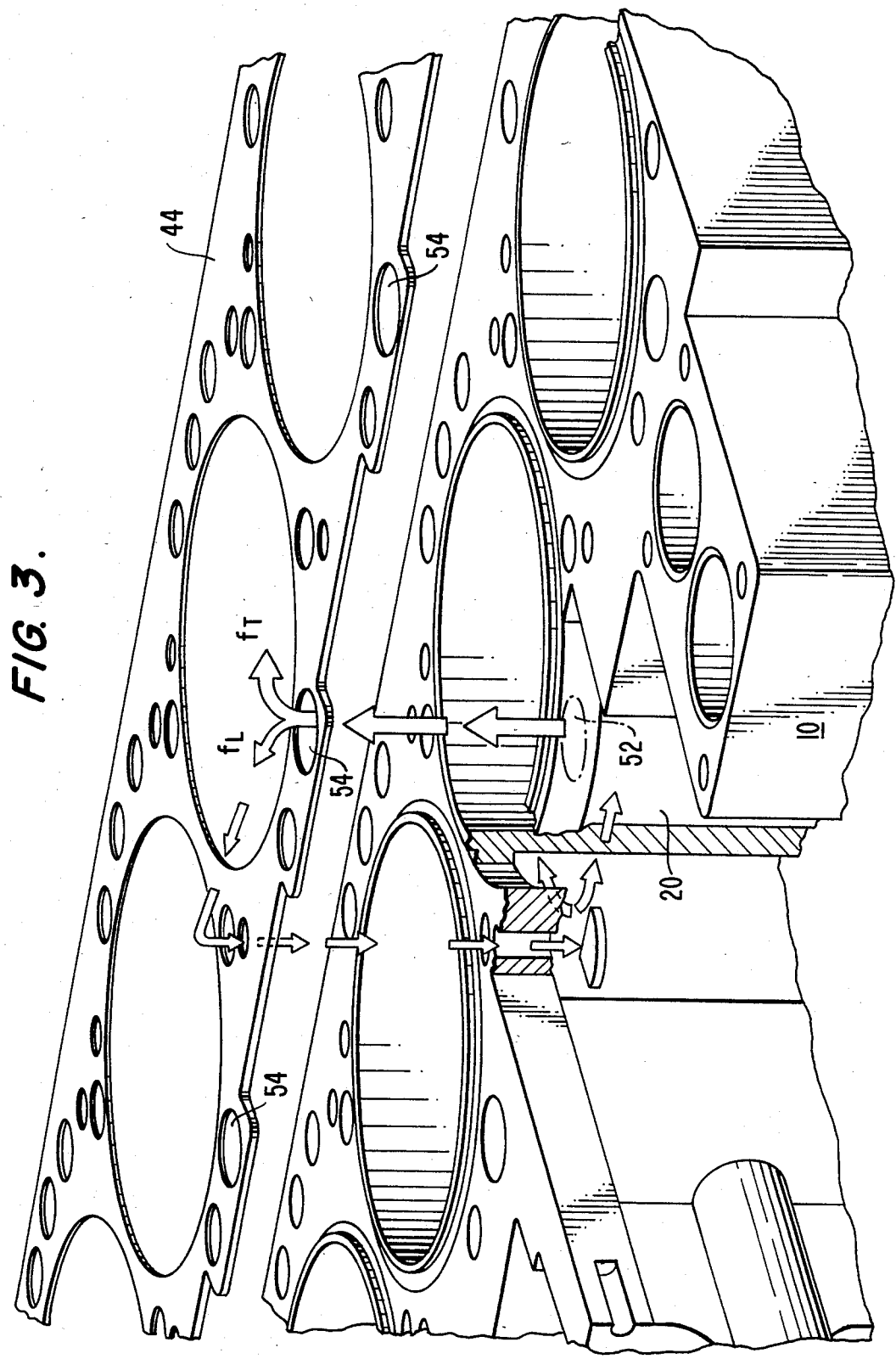
FIG. 3 is a partial diagramatic illustration showing the flow of coolant from the distribution manifold into the cylinder head and from the cylinder block.
Figure 5:
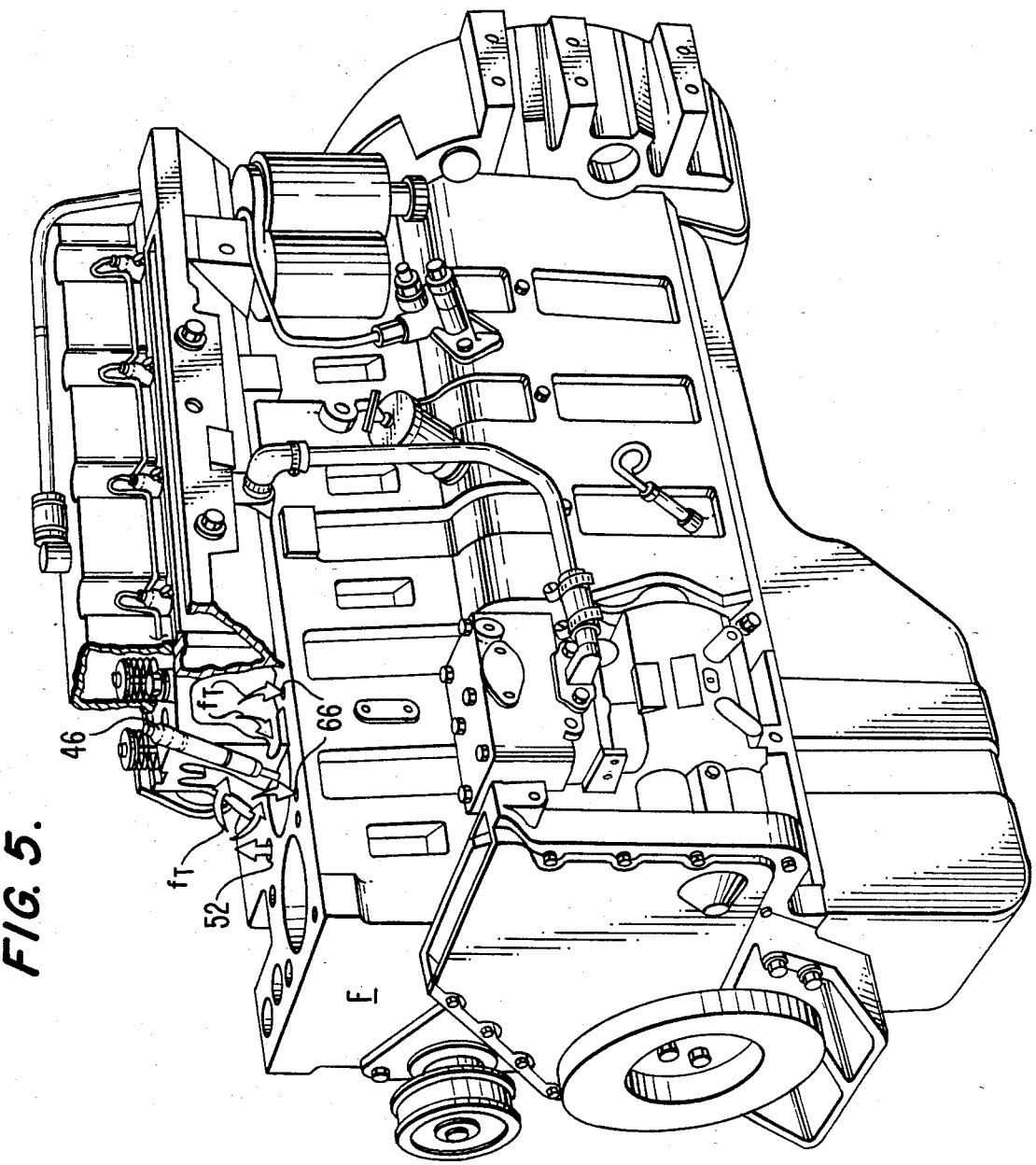
FIG. 5 is a partially broken away illustration of the engine of FIG. 1 diagrammatically depicting the flow of coolant across the head for distribution down into the opposite side of the cylinder block.
Figure 4:
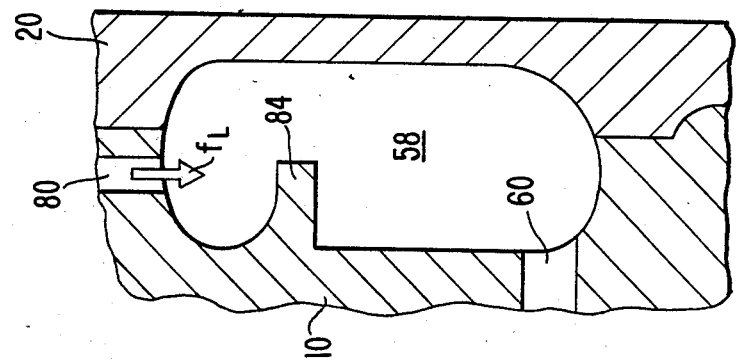
FIG. 4 is a cross-sectional view of the cylinder block illustrating a portion of the coolant space surrounding a cylinder in the vicinity of the outlet to the discharge manifold.
Figure 6:
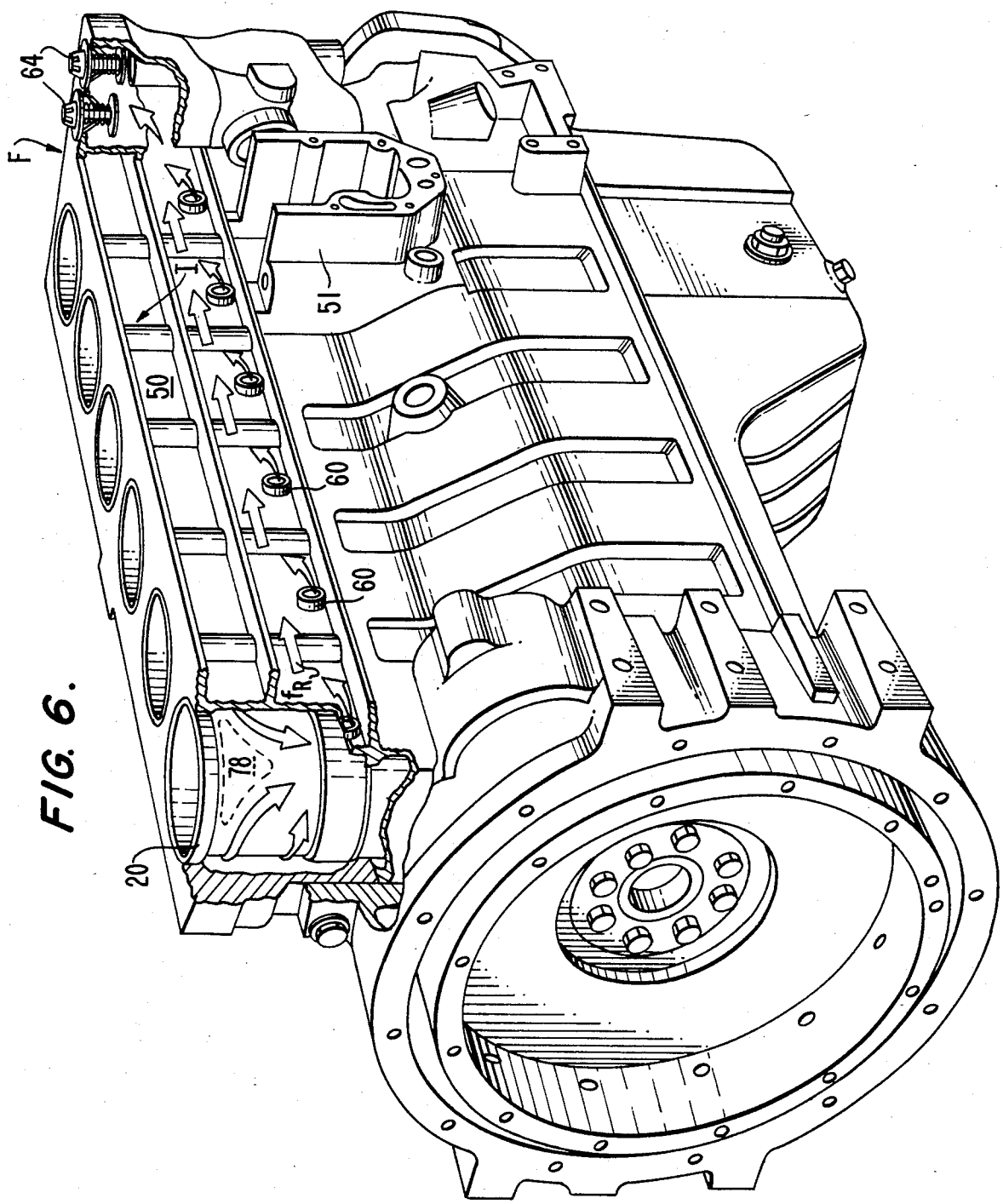
FIG. 6 is a partially broken away view of the engine block of the engine of FIG. 1 illustrating the flow around the cylinder liners and into the discharge manifold.

As can be seen with reference to FIG. 3, coolant emerging from the apertures 52, 54, 56 into the cylinder head divides into longitudinally and transversely directed components $f_L$, $f_T$, respectively. The longitudinal flow component $f_L$ is routed directly into respective coolant chamber 58 (FIG. 4) surrounding the cylinder liners 20 in the engine block 10. The balance of the coolant, coolant flow $f_T$, flows across the bridges of the valve 32, 34, around the injector nozzles and down into the chambers 58 at the opposite side of the engine (FIG. 5). Coolant exits from the coolant chambers 58 surrounding the cylinder liners 20 via a respective cast opening 60 located at the bottom of the chambers 58 (FIGS. 4, 6). From the cast outlet openings 60, the return flow, $f_R$, travels longitudinally through the discharge manifold to the thermostats 64 situated at the front of the engine and, from there, out of the engine. In this regard, it is noted that, depending upon the coolant temperature, the flow will be discharge by being bypassed to the water pump and/or delivered to a radiator for extraction of heat.

For purposes of balancing the flow of coolant through the cylinder head, the gasket 44 is utilized to orifice the flow passages extending between the cylinder head 14 and the cylinder block 10. In this regard, it can be seen that the outlet flow passages from the cylinder head 14 to the block 10 on the cam side of the engine (i.e., the side opposite the manifolds 50, 62) are comprised of a row of apertures 66 in the engine block, arranged in pairs flanking opposite lateral sides of each of the cylinder openings 22a-22f and a single enlarged aperture 68 (FIG. 7) formed in the head so as to overlie the aperture or apertures 66 flanking each lateral side of the cylinder openings. Balancing of the flow through the passages from the cylinder head to the cylinder block, that are formed by the apertures 66, 68, is achieved by way of orificing holes 70a-70f and 72a-72f as will now be described.

Figure 7:
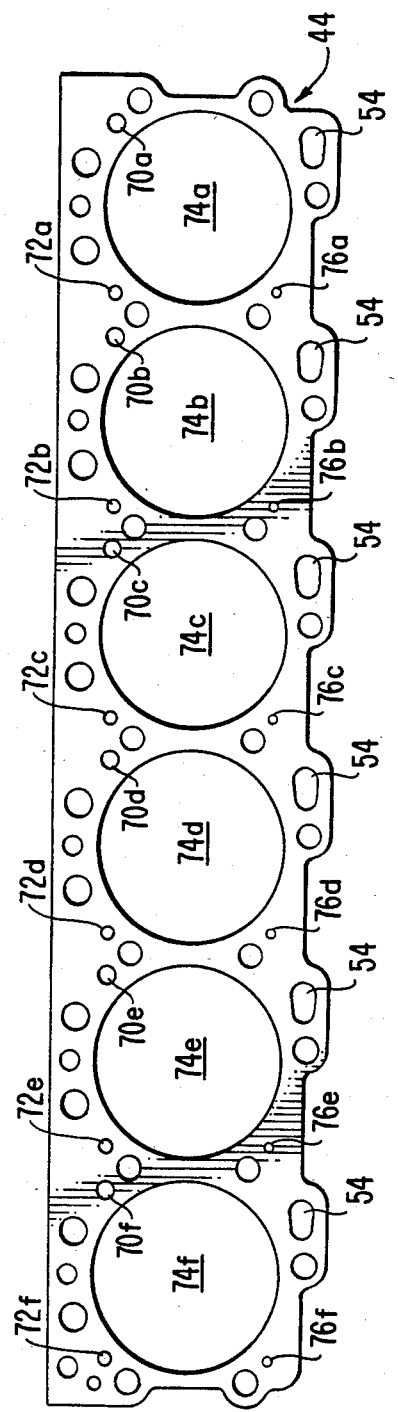
FIG. 7 is a plan view illustrating a head gasket for use in orificing the passages between the engine block and cylinder head.

As can be seen from FIG. 7, gasket 44 is provided with six holes 74a-74f that are sized, positioned, and configured so as to correspond to the cylinder holes formed in the cylinder block 10 for the cylinders liners 20 in the cylinder block 10. Extending in a longitudinal line on an opposite side of the cylinder holes 74a-74f from the intake aperture holes 54, is an alternating series of large and small orificing holes 70a-f and 72a-f, respectively, each cylinder aperture 74 being flanked by a respective pair of orificing holes consisting of a large orificing hole 70 and a small orificing hole 72. The pair of orificing holes 70, 72 are arranged such that the large orificing hole 70 of the gasket is disposed on the same longitudinal side of a cylinder hole 74 as the respective intake aperture 54, while the small orificing hole 72 is disposed on the opposite longitudinal side of the cylinder hole 74 in alignment with a further, intake side, orificing hole 76, whose function will be described later. Furthermore, the apertures 70, 72 are positionally located so as to be between the apertures 66, 68 when the head gasket 44 is sandwiched between the block and head, in its in use position. Thus, the holes 70, 72 which are smaller than the apertures 66, 68, serve to control flow through the passages formed thereby.

Furthermore, based upon studies which were conducted, it has been found that with an engine of the type disclosed herein having a coolant inlet into the distribution manifold at a point situated longitudinally between the cylinder holes 74b, 74c and an outlet from the distribution manifold at its front end (to the right of opening 74a in FIG. 7), the small orificing openings and the large orificing openings of the cylinders that are located between the coolant inlet to the distribution manifold and the coolant outlet from the discharge manifold respectively decrease in size towards the front end of the engine while those associated with the cylinders that are located between the rear of the engine and the coolant inlet, respectively increase in size, with the pair of openings 70b, 72b and 70c, 72c (which are longitudinally on opposite sides of the coolant intake location) being approximately, but need not exactly, the same. In this regard, the following table reflects the orifice hole sizes which have been found to be optimum for a six cylinder, in line diesel engine as illustrated in the drawings.

TABLE I

| Cylinder Aperture | Diameter Large Orificing Opening | Diameter Small Orificing Opening |
| --- | --- | --- |
| 74a | 7.35 | 6.74 |
| 74b | 7.95 | 7.19 |

TABLE I-continued

| Cylinder Aperture | Diameter Large Orificing Opening | Diameter Small Orificing Opening |
|---|---|---|
| 74c | 7.94 | 7.18 |
| 74d | 9.6 | 8.27 |
| 74e | 10.66 | 8.85 |
| 74f | 10.84 | 8.94 |

The majority of the coolant delivered from the cylinder head into the coolant chambers 58 surrounding the cylinder liners 20 is delivered thereto via the apertures 66, 68 and the orificing openings 70, 72. Upon entering the coolant chamber 58, the coolant flow travels circumferentially about both sides of the cylinder liner and downwardly to the bottom of the opposite side of the coolant chamber 58 where it exits via the cast outlet opening 60. However, it has been found that if all of the flow to the chamber 58 were delivered via the passages formed by the apertures 66, 68 and orificing holes 70, 72 an air pocket would be formed in the zone 78 (FIG. 6) located above each cast outlet opening 60 that would result in a hot spot being created. In order to avoid this problem and ensure that coolant is diffused throughout the zone 78, the top of the cylinder block is provided with downflow holes 80 and the cylinder head is provided with correspondingly located downflow holes 82. The outlet passages formed by holes 80, 82 is orificed to a small diameter by way of the openings 76a-f in the head gasket 44. All of the openings 76 are of the same relatively small diameter, a 4 mm diameter being used in conjunction with orificing holes of the diameters indicated in Table I.

Additionally, to prevent the flow of coolant $f_L$ from passing directly downwardly from the openings 80 to the cast outlet openings 60, a deflector ledge 84 is situated approximately 20 mm below the outlet end of aperture 80 (FIGS. 3, 4). The ledge 84 should be only slightly wider than the diameter of the aperture 80 and radially should not obstruct more than 50% of the distance between the facing wall surfaces of the cylinder block and liner defining the annular coolant chamber 58. In this manner, the deflector ledge 84 will cause the flow $f_L$ to be diffused circumferentially in the manner depicted in FIG. 3 so that the flow $f_L$ from the apertures 80 will result in the zones 78 being filled with coolant, thereby ensuring that no air pockets are formed and that the cylinder liner is uniformly surrounded by coolant flowing through the coolant chamber 58.

It is also noted the location of the ledge approximately 20 mm below the apertures 80 is independent of the diameter of the openings through which the flow enters the coolant chamber 58 and is also independent of the chamber 58. Similarly, while the top side of ledge 84 is shown as having a curved surface which merges into a curved surface of the cylinder block 10, ledge 84 may be provided with a horizontal top surface which adjoins a planar surface of the block in the same manner shown with respect to the underside of ledge 84.

Figure 8:
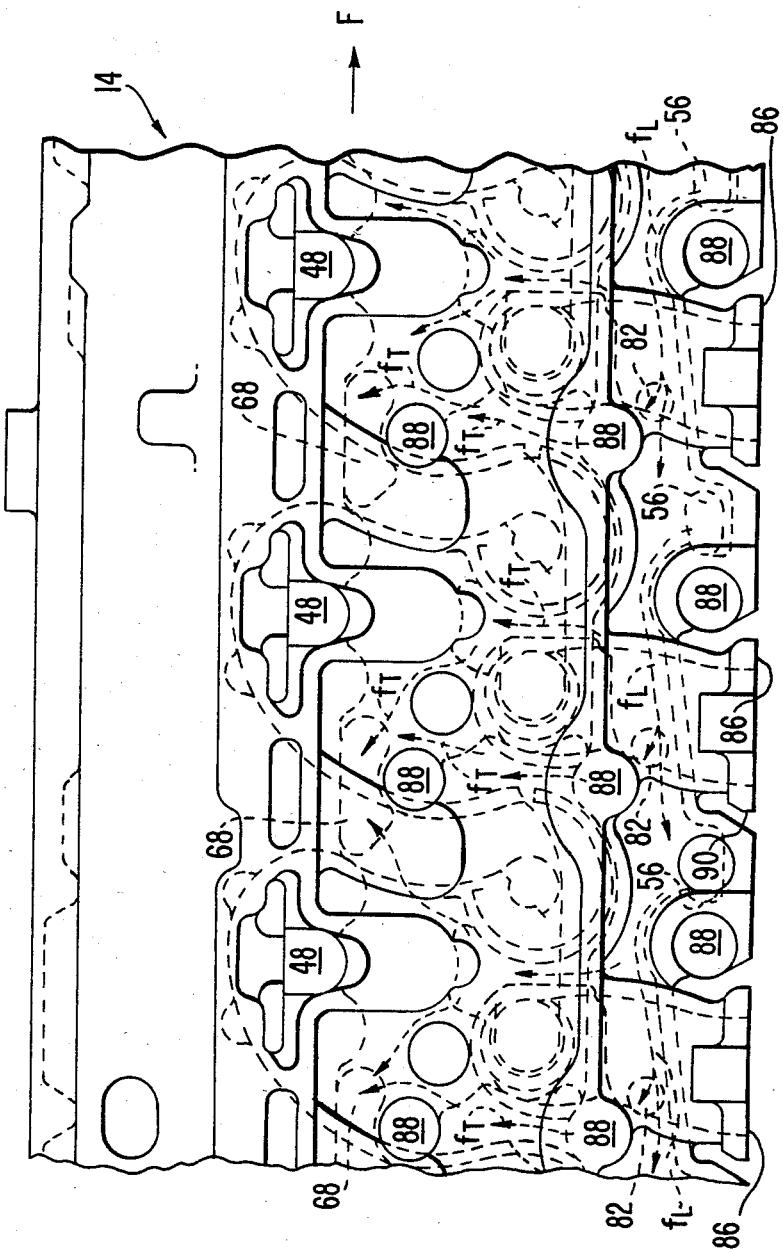
FIG. 8 is a fragmentary plan view of the cylinder head showing the internal passageways in broken lines.

In addition to the above described characteristics, the present invention is also designed to improve the exhaust heat rejection characteristics of the engine. In this regard and with reference to FIG. 8, it can be seen that each of the exhaust outlets of the cylinder head 14 for the exhaust valves 32 is provided with a passage defined by relatively thin walls (approximately only four mm thick) and the relatively thin walls of the outer ends of exhaust outlets 86 are separated by gap 90 from the adjacent head portions within which the inlets 56 and the bolt holes 88 are situated. This small separation between the intake apertures 56 and the outer ends of the exhaust outlets 86 minimizes the heat rejection from exhaust gases and permits a non-distorting thermal growth and contraction. Furthermore, the coolant flow path is such that the flow $f_L$ from the intake apertures 56 passes over the exhaust outlets 86, near their outer ends, but the coolant does not go around the exhaust ports, but rather travels through cross passages between the intake and exhaust valve passages are reflected by the flow $f_T$ in FIG. 8.

INDUSTRIAL APPLICABILITY

An engine constructed in accordance with the foregoing description will be applicable to a wide range of internal combustion engines and enables the engine to be designed in a compact configuration while still obtaining a uniform and effective cooling. That is, due to the flow circuit passing from the intake manifold into the head, across the head and down and around the cylinder spaces in the engine block to a collection manifold adjacent the distribution manifold, a compact engine configuration is achievable along with a uniform cooling effect. Moreover, since 60% of the heat extracted by the coolant is withdrawn from the head, the delivery of the coolant initially to the head produces a secondary benefit in terms of the improvement of the ability of the coolant to extract heat as it passes through the cylinder head, as opposed to the situation where the coolant is delivered into the head after its temperature has been elevated while passing through the cylinder block. The use of a conventionally constructed head gasket to orifice passages from the cylinder head to the block not only eliminates the need for precision drilling of the associated apertures in the head and block, but facilitates adjustment of the orifice hole sizes should actual engine operating conditions for a particular engine make such desirable.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

What is claimed is:

1. An internal combustion engine with a cylinder block having a line of cylinders and a cylinder head attached to a top surface of the cylinder block with a head gasket therebetween, longitudinally extending coolant distribution and discharge manifolds being provided adjacent each other on one side of the cylinder block, and coolant circuit means for circulating a liquid coolant from the distribution manifold through the cylinder head, from the cylinder head to coolant chambers surrounding each of the cylinders in said cylinder block and from said coolant chambers to the discharge manifold, wherein said coolant circuit means comprises a row of intake passages connecting the distribution manifold with the interior of the cylinder head, each of said intake passages being located in association with a respective one of said cylinders on one side thereof, coolant flow paths through the cylinder head for directing coolant from said intake passages longitudinal and transversely through the cylinder head to outlet flow passages connecting the interior of the cylinder head with a top portion of coolant chambers surrounding each of said cylinders at a laterally opposite side of said cylinders from the side with said intake passages, and outlet openings connecting a bottom portion of said coolant chambers with said discharge manifold.

2. An internal combustion engine according to claim 1, comprising further outlet passages, said further outlet passages being located on said one side of the cylinders at a longitudinally opposite side thereof from said intake passages and connecting the interior of the cylinder head with the top portion of said coolant chamber at a location above said outlet openings, and localized radially projecting deflector ledges situated within said coolant chambers, each said deflector ledge being positioned below a respective said further outlet passage in a manner for diffusing coolant flow therefrom circumferentially about the top of said coolant chamber.

3. An internal combustion engine according to claim 1, wherein said outlet passages are constructed for balancing flow in said flow paths through the cylinder head and comprise an alternating series of large and small orificed openings, a large and a small orificed opening being paired in association with each cylinder and each large orificed opening being on a longitudinally opposite side of the associated cylinder relative to the small orificed opening paired therewith.

4. An internal combustion engine according to claim 3, wherein the large orificed opening is in approximate longitudinal alignment with a respective one of said intake passages.

5. An internal combustion engine according to claim 4, wherein further outlet passages are provided from the interior of said cylinder head to the top portion of said coolant chambers, each further outlet passage being located at a laterally opposite side of a respective cylinder from a respective small orificed opening in longitudinal alignment therewith and at a position longitudinally downstream from a respective intake opening in a direction of flow therefrom.

6. An internal combustion engine according to claim 5, comprising localized radially projecting deflector ledges situated within said coolant chambers, each said deflector ledge being positioned below a respective said further outlet passage in a manner for diffusing coolant flow therefrom circumferentially about the top of said coolant chamber.

7. An internal combustion engine according to claim 5, wherein said distribution manifold has an inlet for receiving coolant from a coolant pump that is situated at a location that is longitudinally aligned with a point between an intermediate pair of cylinders of the line of cylinders, and wherein said discharge manifold has a discharge outlet at an end of the engine.

8. An internal combustion engine according to claim 7, wherein large orificed openings and small orificed openings associated with cylinders located between said point and the outlet end of the engine, respectively, progressively decrease in flow-through area in a direction longitudinally away from said point and said large orifice openings and small orifice openings associated with cylinders located between said point and an opposite end of the engine, respectively, progressively increase in flow-through area in a direction longitudinally away from said point.

9. An internal combustion engine according to claim 8, wherein all of said further outlet passage have the same flow-through area, the flow-through area of the further outlet passages being less than that of said small orificed openings.

10. An internal combustion engine according to claim 3, wherein said distribution manifold has an inlet for receiving coolant from a coolant pump that is situated at a location that is longitudinally aligned with a point between an intermediate pair of cylinders of the line of cylinders, and wherein said discharge manifold has a discharge outlet at an end of the engine.

11. An internal combustion engine according to claim 10, wherein large orificed openings and small orificed openings associated with cylinders located between said point and the outlet end of the engine, respectively, progressively decrease in flow-through area in a direction longitudinally away from said point and said large orifice openings and small orifice openings associated with cylinders located between said point and an opposite end of the engine, respectively, progressively decrease in flow-through area in a direction longitudinally away from said point.

12. An internal combustion engine according to claim 1, wherein a pair of valves are positioned in the cylinder head above each of the cylinders, said pair of valves being closely positioned to each other in a longitudinal direction of the engine and a boss for a fuel injection nozzle being situated between said valves laterally adjacent an opposite side thereof relative to said intake passages, wherein said pair of valves comprise an exhaust valve and an intake valve; wherein exhaust outlet passages extending from the exhaust valves are defined by relatively thin walls and are situated relative to said coolant flow paths in a manner that the coolant passing longitudinally through the cylinder head passes thereover near outlet ends thereof in heat exchange relationship; and wherein a cross passage for coolant passing transversely through the cylinder head is provided between each pair of intake and exhaust valves and across the adjacent injector boss.

13. An internal combustion engine according to claim 12, wherein a gap is provied separating the outlet ends of the exhaust passages from laterally adjacent portions of the cylinder head for facilitating thermal growth and contraction, said intake passages being located in said laterally adjacent portions.

14. An internal combustion engine according to claim 12, wherein said outlet passage are constructed for balancing flow in said flow paths through the cylinder head and comprise an alternating series of large and small orificed openings, a large and a small orificed opening being paired in association with each cylinder and each large orificed opening being on a longitudinally opposite side of the associated cylinder relative to the small orificed opening paired therewith.

15. An internal combustion according to claim 14, wherein the large orificed opening is in approximate longitudinal alignment with a respective one of said intake passages.

16. An internal combustion engine according to claim 15, wherein further outlet passages are provided from the interior of said cylinder head to the top portion of said coolant chambers, each further outlet passage being located at a laterally opposite side of a respective cylinder from a respective small orificed opening in longitudinal alignment therewith and at a position longitudinally downstream from a respective intake opening in a direction of flow therefrom.

17. An internal combustion engine according to claim 16, comprising localized radially projecting deflector ledges situated within said coolant chambers, each said deflector ledge being positioned below a respective said further outlet passage in a manner for diffusing coolant flow therefrom circumferentially about the top of said coolant chamber.

* * * * *